United States Patent [19]

Deavers et al.

[11] Patent Number: 4,563,622

[45] Date of Patent: Jan. 7, 1986

[54] SIMPLE BRUSHLESS DC FAN MOTOR

[75] Inventors: Clyde J. Deavers, Woodstock; James Reffelt, Shokan, both of N.Y.

[73] Assignee: Rotron Incorporated, Woodstock, N.Y.

[21] Appl. No.: 690,401

[22] Filed: Jan. 10, 1985

Related U.S. Application Data

[63] Continuation of Ser. No. 629,753, Jul. 12, 1984, abandoned, which is a continuation of Ser. No. 416,504, Sep. 10, 1982, abandoned.

[51] Int. Cl.$^4$ .................. H02P 7/36; H02K 29/02
[52] U.S. Cl. .................... 318/254; 318/138; 318/439; 310/62; 310/46; 310/156
[58] Field of Search .............. 318/254, 138, 439; 310/62, 63, 68 R, 46, 156

[56] References Cited

U.S. PATENT DOCUMENTS

| | | | |
|---|---|---|---|
| 1,996,195 | 4/1935 | Ferguson | 230/273 |
| 2,697,986 | 12/1954 | Meagher | 103/87 |
| 3,083,314 | 3/1963 | Ratajski | 310/219 |
| 3,098,958 | 7/1963 | Katz | 318/138 |
| 3,230,434 | 1/1966 | Bauerlein | 310/156 X |
| 3,242,404 | 3/1966 | Favre | 310/46 X |
| 3,264,538 | 8/1966 | Brailsford | 318/138 |
| 3,379,907 | 4/1968 | Hollinger | 310/77 |
| 3,483,456 | 12/1969 | Brunner et al. | 318/138 |
| 3,577,049 | 5/1971 | Madurski | 318/138 |
| 3,631,272 | 12/1971 | Kirii | 310/46 X |
| 3,662,196 | 5/1972 | Ruschmann | 310/46 X |
| 3,845,334 | 10/1974 | Harada et al. | 310/46 |
| 3,891,905 | 6/1975 | Muller | 318/254 |
| 4,025,831 | 5/1977 | Webb | 318/254 |
| 4,115,715 | 9/1978 | Müller | 318/254 X |
| 4,130,769 | 12/1978 | Karube | 310/46 |
| 4,164,690 | 8/1979 | Muller et al. | 318/254 |
| 4,217,508 | 8/1980 | Uzuka | 318/254 X |
| 4,322,666 | 3/1982 | Müller | 318/254 |
| 4,371,817 | 2/1983 | Müller | 318/138 X |
| 4,459,087 | 7/1984 | Barge | 318/254 X |

FOREIGN PATENT DOCUMENTS

| | | | |
|---|---|---|---|
| EP18904 | 11/1980 | European Pat. Off. | 310/68 |
| 3026797 | 2/1982 | Fed. Rep. of Germany | 310/68 |

OTHER PUBLICATIONS

Air Currents, vol. 2, No. 1, Rotron, Inc., Copyright 1977.
Rotron Drawings, M500246, M500247 and PC027648.
Rotron Photographs.
Michael Oppenheimer, "In IC Form, Hall-Effect Devices Can Take on Many New Applications", Electronics/Aug. 2, 1971.
Jearl Walker, "The Amateur Scientist", Scientific American, Mar. 1982.

Primary Examiner—Bernard Roskoski
Assistant Examiner—Shik Luen Paul Ip
Attorney, Agent, or Firm—Brumbaugh, Graves, Donohue & Raymond

[57] ABSTRACT

A simplified fan and brushless DC motor employs an annular permanent magnet magnetized in segments about its circumference. Each segment is oppositely radially magnetized with respect to the preceding segment as one proceeds around the magnet. Fan blades are located within the annular magnet. A coil and electromagnet structure defining two pole pieces reside outside the permanent magnet annulus. A Hall effect device switches the coil off and on in response to passage of the segments of the rotor magnet. Thus commutated, the single coil affects rotation of the rotor and the fan blades. A permanent magnet supported on the stator structure serves to magnetically detent the permanent magnet of the rotor, bringing the rotor to rest correctly for restarting.

22 Claims, 3 Drawing Figures

SIMPLE BRUSHLESS DC FAN MOTOR

This application is a continuation of application Ser. No. 629,753, filed on July 12, 1984, which is a continuation of Ser. No. 416,504, filed Sept. 10, 1982, now abandoned.

BACKGROUND OF THE INVENTION

This invention relates to brushless DC motors electronically commutated and more particularly to brushless DC fan motors that are of simple construction, inexpensive to manufacture, and reliable.

A typical goal in the manufacture of fans is a motor that is very simple and consequently has a low manufacturing cost. In AC motors for fans, the side armature AC motor comes closest to achieving these goals. However, recently, DC motors for fans have become more and more attractive, particularly for fans used to cool electronics where DC power is available.

Brushless DC motors using Hall effect devices to sense the commutation points as the rotor rotates are well known in the art. One or more stator coils are repeatedly energized or have their energization reversed to effect relocation of the electromagnetic field produced by poles of the stator core. A permanent magnet rotor is continuously attracted to the new electromagnetic pole locations. For commutation, one or more Hall effect devices senses the location of the poles of the rotor permanent magnet to control the energization of the stator winding or windings, or a Hall device detects the position of one or more commutation magnets mounted to rotate with the rotor and provided especially to indicate, by changing the state of the Hall device, the commutation points as the rotor turns.

Many brushless DC motors have been complex in both their structure and their commutation circuitry. Where simple, low cost and reliable fan motors have been needed these brushless DC motors, which might more appropriately have been used for, say, precise disc or tape drives, have been too expensive for the simple purpose of fan rotation.

BRIEF SUMMARY OF THE INVENTION

In accordance with this invention, a simple DC brushless motor has a rotor with an annular permanent magnet and a stator coil and electromagnet structure outside the annular magnet. The annular magnet of the rotor is magnetized in segments about its circumference, each succeeding segment being oppositely magnetized in the radial direction. The electromagnet structure includes pole pieces magnetized by the coil and closely proximate the outer cylindrical surface of the annular magnet. A Hall effect device senses the passage of the rotor magnet segments to turn the coil on and off. The location of the electromagnet pole pieces and of the Hall effect device are such that, each time the coil is energized, the correct magnetic polarities are established at the pole pieces to attract the next approaching segments or poles of the annular magnet.

A further permanent magnet supported on the stator structure close to the periphery of the annular rotor magnet magnetically detents the annular magnet so that the rotor is correctly positioned for start-up.

In the fan of the invention, fan blades are located within and affixed to the annular magnet. The magnet and the fan blades are mounted for rotation at a central hub. The stator includes a housing and support structure extending from proximate the magnet to the hub and supporting the rotor hub for rotation. The housing encircles the annular magnet and the fan blades. The support structure includes mounting means formed in the housing about the periphery of the motor. A small compartment in the housing houses the stator coil, the electromagnet structure and all circuit elements of the relatively simple switching circuitry, including the commutation-effecting Hall device.

Whereas, with its large annular rotor and external stator structure, the motor of this invention might not be advantageous for certain other applications, it is particularly suitable for fans. The tips of fan blades ordinarily define a circular path and the area within the circle is necessarily used. Driving and fan blades directly from a magnet secured to the blade tips thus requires little additional space and permits a narrow fan since there is no need to couple a motor to the hub or shaft supporting the blades centrally. The drive is efficient and is economically accomplished in that the rotary force applied to the magnet is imparted directly to the blades. Less force is required to move the blades against a load than when force is applied where the blades are centrally supported. Furthermore, using the rotor of the current invention a large proportion of the circular area from the blade tips inward can be devoted to air flow, inasmuch as no space therein is taken up by motor. The advantages of the combination fan and rotor, then, surpass the apparent sum of the advantages of each.

The above and further features of the invention will be better understood with reference to the several figures of the attached drawings and the following detailed description of a preferred embodiment.

DETAILED DESCRIPTION OF THE PREFERRED EMBODIMENT

Figure 1:
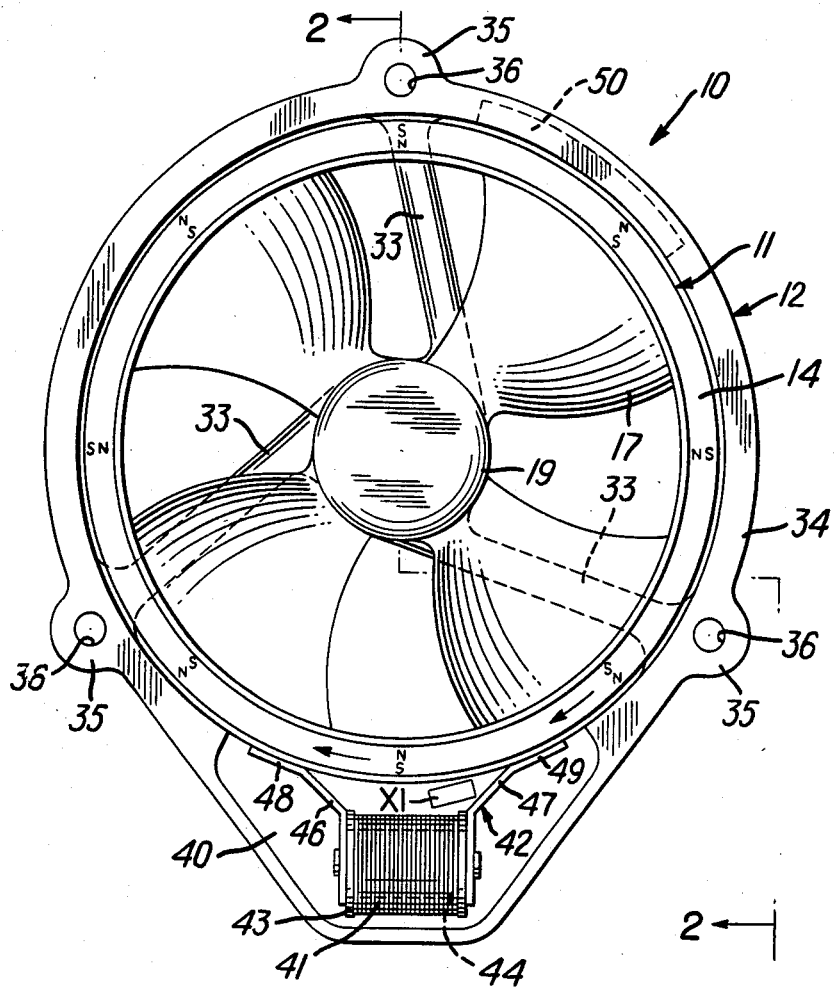
FIG. 1 is a top plan view of the fan and motor according to this invention and shows the rotor's annular permanent magnet magnetized in segments about its periphery and an external coil and electromagnet stator structure.

In FIG. 1 a fan and motor combination 10 according to the invention includes a rotor 11 and a stator 12. The rotor 11 has an annular permanent magnet 14, magnetized in segments about its circumference. As illustrated, each succeeding segment about the circumference is oppositely magnetized in the radial direction. The magnet 14 is secured on a ring 16. Fan blades 17 extend from the ring 16 to a central hub 19.

Figure 2:
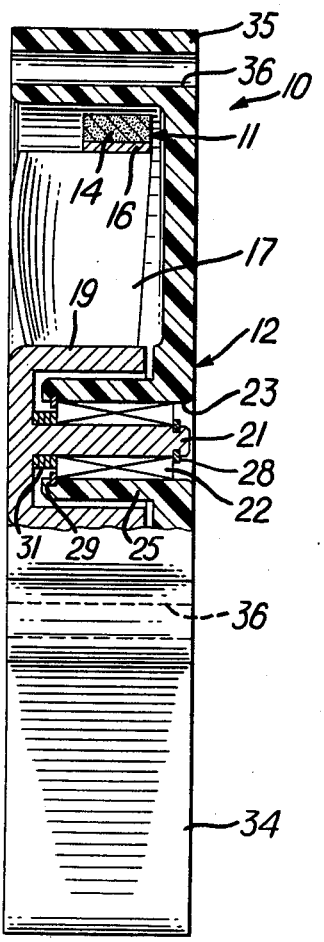
FIG. 2 is a side elevational view of the fan and motor of FIG. 1, partially in section, along the line 2—2 of FIG. 1, and illustrates the mounting of the rotor and fan blades on a hub for rotation about a central support section of the stator.

In FIG. 2, the hub 19 carries a shaft 21 supported in the sleeve bearing 22 located in a bore 23 formed in a central projecting portion 25 of the stator 12. C-rings 28 and 29 retain the bearing and secure the rotor and stator together. Spacers or shims 31 take up any excess end play in the assembly. The particular mounting employed to locate the rotor assembly and fan blades rotatably within the stator structure is exemplary only and not to be construed as essential to the invention. For example, roller bearings or other bearing structure can be substituted for the sleeve bearing 22 and other arrangements than the shaft 21 and bore 23 will readily be envisioned.

Three struts 33 radiate outwardly from the central stator projection 25. These connect to a generally circular housing 34. Mounting bosses 35 define holes 36 about the periphery of the housing, enabling the entire motor and fan to be mounted by, e.g., bolts passed through the holes 36.

At one location, as seen at the bottom of FIG. 1, the housing 34 forms a compartment 40 housing a stator coil 41, electromagnet structure 42, a Hall effect device X1, and the remaining circuit elements of the commutation circuit, not shown in FIG. 1. The coil 41 is wound on a bobbin 43. A core 44 of magnetic material extends through the bobbin from end to end and forms a part of the electromagnet structure 42. Alternatively, the bobbin can be a part of the electromagnet structure. That structure also includes a pair of arms 46 and 47 secured in flux conducting relation to the magnetic core 44 and terminating in pole pieces 48 and 49 closely proximate the outer surface of the permanent magnet 14. As can be seen in FIG. 1, the spacing of the pole pieces 48 and 49 is such that, with the magnet located as shown, energization of the coil 41 to make pole piece 48 north and pole piece 49 south will affect clockwise rotation of the rotor structure and the fan blades.

A further permanent magnet 50 magnetically detents the annular rotor magnet in a position such that starting of the motor and fan is assured. At start-up, the coil is energized to apply, via the pole pieces 48 and 49, starting torque to the annular magnet. The Hall effect device X1 controls energization of the coil 41 such that the coil is energized to attract approaching poles of the annular rotor magnet and then deenergized when the magnetic field of the annular permanent magnet is reversed at the Hall device as a result of movement of a new, oppositely magnetically polarized segment into proximity with the device. Deenergization of the coil allows passage of the next poles past the pole pieces 48 and 49 until the Hall device X1 senses the reversal of the magnetic field, signaling the approach of the next segments. The coil is reenergized and the pole pieces attract the next two segments. This sequence repeats itself until the rotor comes to an equilibrium speed where the aerodynamic load balances the motor power.

Figure 3:
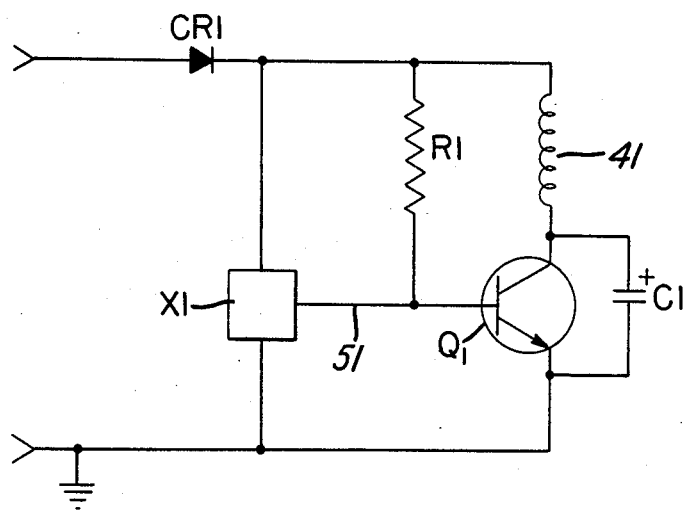
FIG. 3 is a schematic diagram of an energizing circuit for the stator coil.

This operation allows use of a simplified commutation circuit. In FIG. 3, the Hall device X1, which can be a Hall switch, for example, is seen controlling a transistor Q1 whose collector-emitter circuit is in series with the stator coil 41. One such Hall switch is the sprague UGN-3013T of Sprague Electric Company, Worcester, Mass. Exposure of the Hall effect device X1 to a magnetic field of the correct direction or polarity opens (breaks) a conduction path from a line 51 to ground. With this path thus open, a resistor R1 supplies base drive to Q1, biasing Q1 into conduction and energizing the coil 41. When the Hall effect device X1 experiences a magnetic field of reverse direction or polarity, or no field at all, the current path from ground to R1 and the base of Q1 closes. This path of conduction, now closed, starves Q1 of base drive and Q1 no longer conducts, the coil 41 is deenergized until X1 experiences a field of the appropriate direction again. Capacitor C1 damps transients that arise from the abrupt switching of the coil 41. The diode CR1 prevents current reversals back through the input leads to, for example, the electronics being cooled. Typically, the input power to this simple circuit arrangement is taken from the DC bias voltage available nearby in the cooled electronics. In a preferred embodiment, the circuit elements are mounted on a printed circuitboard of essentially the same shape as the cavity that forms the compartment 40 in FIG. 1. The circuitboard is supported above the cavity with the circuit elements projecting downward and housed within the cavity so that the fan and motor has the compact shape seen in FIG. 1 and the narrow profile shown in FIG. 2.

From the foregoing it will be seen that a simple and quite original combination of motor and fan has been provided. It will be readily apparent to those skilled in the art that many variations in the foregoing exemplary embodiment can be made without departing from the spirit and scope of the invention, as defined in the appended claims.

We claim:

1. A DC motor comprising:
   a rotor with an annular permanent magnet, the magnet defining magnetic segments, wherein segments of like polarization in the radial outward direction are spaced apart circumferentially about the rotor;
   a stator having an electromagnetic structure outside said annular magnet, proximate the periphery thereof, the electromagnet structure including, in a location to one side of the annular magnet and extending less than 180° around the magnet, coil means and electromagnetic flux conducting means in flux conducting relation to the coil and located to establish a magnetic field applying rotational torque to the annular magnet;
   position detecting means for commutating electrical current to the coil means to repeatedly produce said field and apply torque to succeeding segments as the rotor rotates.

2. The motor according to claim 1, wherein the electromagnetic flux conducting means defines at least one pole piece of flux conducting material terminating adjacent the exterior of the annular magnet within said location.

3. The motor according to claim 2, wherein the electromagnet structure includes a flux path having a pair of arms associated with ends of the coil means and extending to said pole piece and a second pole piece spaced apart along the circumference of the annular magnet, said coil means and pole pieces occupying the location on one side of the annular magnet that extends less than 180° around the magnet.

4. The motor according to claim 3, wherein the pole pieces are spaced apart by such a distance as to each attract a separate magnetized segment of the annular magnet when the coil means is energized.

5. The motor according to claim 4, wherein adjacent segments of the annular magnet are oppositely polarized and the pole pieces are located to attract the adjacent; oppositely polarized segments when the coil means is energized.

6. The motor according to claim 1, wherein the stator includes a housing defining a compartment at said location on the periphery of the path of rotation of the annular magnet, said coil means and electromagnetic flux conducting means being located in said compartment.

7. The motor according to claim 6, wherein said compartment houses the position detecting means for commutating including a Hall effect device located proximate the annular magnet and switching circuit means for energizing the coil means when a magnetized segment of one polarity is adjacent the Hall effect device.

8. The motor according to claim 6, wherein the stator housing encircles the annular magnet.

9. The motor according to claim 1, further comprising fan blades located within the annular magnet.

10. A motor according to claim 9, wherein the fan blades extend from proximate the inside surface of the annular magnet to a central hub, said stator having a central member supporting, for rotation, the hub, the blades, and the rotor members, including the annular magnet, the stator further including struts extending outwardly from the central stator member to a housing encircling the fan blades, said housing supporting the coil proximate the annular rotor magnet and adjacent the outer surface thereon.

11. A fan and motor combination including a central rotatable hub, fan blades radiating outwardly from the hub, an annular permanent magnet having segments polarized oppositely in the radial outward direction, said permanent magnet encircling the blades of the fan and secured to the blades, a housing encircling the annular permanent magnet, a single electromagnet structure defining pole pieces supported by the housing outside the annular magnet and including electromagnetic coil means wound thereon and electromagnetically coupled to the single electromagnet structure including the pole pieces, commutation means responsive to the position of the permanent magnet to repeatedly energize the coil to apply a rotary force to segments of the annular magnet, and a second permanent magnet carried by the housing and located proximate the annular magnet to bring the annular magnet to rest in a position such that the coil and electromagnet structure will apply start-up force on the annular magnet to begin rotation of the annular magnet when the stopped motor and fan is energized.

12. In a brushless DC motor; a rotor having a permanent magnet magnetized in segments proceeding circumferentially on the magnet; a stator having only a single coil support structure having coil means including a winding wound thereon at only one location along the periphery of the magnet and at least one pole piece proximate the magnet; means for supplying current to the winding in one direction only; and commutation means controlling the means for supplying to sequentially and repeatedly energize the winding to attract a segment of a particular polarity, and then deenergize the winding until another segment of the particular polarity is rotated into position to be attracted.

13. The motor according to claim 12, wherein the motor is a fan motor, the magnet is annular, and fan blades are located inside the annular magnet.

14. The motor according to claim 1, wherein said location containing the coil means and flux conducting means extends less than 90° around the annular permanent magnet.

15. The motor according to claim 14, wherein said coil means and flux conducting means in a location extending less than 90° around the annular permanent magnet is the only electromagnet structure of the stator.

16. The motor according to claim 1, wherein the annular permanent magnet comprises a narrow ring having an internal radius at least twice the radial thickness of the ring.

17. The motor according to claim 16, wherein the magnet has at least six segments, adjacent segments being oppositely polarized, the electromagnet structure terminating in two pole pieces producing oppositely directed magnetic fields at the outer circumference of the magnet when the coil means is energized with a direct current, the pole pieces being spaced apart to face adjacent oppositely polarized segments across an air gap to apply rotational torque thereto when the coil is energized.

18. The motor according to claim 1, wherein means to be driven by the rotor are affixed to the annular magnet and extend inwardly thereof.

19. A combination motor and fan comprising a rotor having an annular permanent magnet magnetized in segments with segments of like polarity being circumferentially spaced apart, the annular magnet defining a relatively large central opening through the motor; fan blades located in the central opening and connected to the annular magnet to be rotated by the magnet, for delivery of air through the central opening, stator structure in association with the magnet including electromagnetic coil means for producing an electromagnetic field proximate the annular magnet to produce rotational torque on the magnet, means for detecting the relative rotational position of the rotor and means responsive to the detection means for energizing the coil to produce the rotational torque.

20. The motor and fan according to claim 21, wherein the stator structure further comprises struts projecting inward towards the center of the central opening, support means located centrally of the opening and affixed to the struts, a rotateable hub supported on the support means, the blades being affixed to the hub, the support means supporting the rotor for rotation, including the hub, the blades and the magnet.

21. In a brushless DC motor having a permanent magnet rotor, stator electromagnet structure, and means for controlling energization of the stator permanent magnet structure in dependence on the angular position of the rotor; the improvement comprising:

the permanent magnet rotor including an annular rotor magnet magnetized in segments, circumferentially adjacent segments having oppositely polarized faces facing across a radial air gap to the stator;

the stator electromagnet structure including an assembly comprising a coil wound onto an electromagnet support structure, and first and second pole pieces secured to the electromagnet support structure at opposite ends of the coil and terminating in, respectively, first and second electromagnetic field producing portions facing the annular magnet across the air gap;

the means for controlling energization being connected with the coil to energize the coil with current oppositely magnetizing the first and second electromagnetic field producing portions;

said first and second electromagnetic field producing portions being spaced apart circumferentially of the magnet, and facing oppositely polarized faces of the magnet across the air gap to apply a rotational magnetic force to magnet segments having oppositely polarized faces; and the assembly being confined at a location to one side of the annular magnet and extending less than 180° circumferentially thereof.

22. The motor according to claim 21, wherein said assembly includes a bobbin on which the coil is wound, a core of electromagnetic material extending through the bobbin and joined to the pole pieces in flux conducting relation thereto.

* * * * *

UNITED STATES PATENT AND TRADEMARK OFFICE
CERTIFICATE OF CORRECTION

PATENT NO. : 4,563,622

DATED : Jan. 7, 1986

INVENTOR(S) : Deavers et al.

It is certified that error appears in the above-identified patent and that said Letters Patent is hereby corrected as shown below:

First page, Item 56, add to the list of "U.S. PATENT DOCUMENTS" the following references:

```
--2,472,039   5/1949    Zacharias ..... ·230/259
  2,912,609  11/1959    Kassner ....... 310/156
  3,626,263  12/1971    McBride ....... 318/138
  3,909,647   9/1975    Peterson ...... 310,156
  3,961,211   6/1976    Vergues ....... 310/68C
  4,358,245  11/1982    Gray...........
  4,373,148   2/1983    Gutz .......... 318/254--.
```

Col. 6, line 25, "claim 21" should read --claim 19--.

Signed and Sealed this

Thirtieth Day of December, 1986

Attest:

DONALD J. QUIGG

Attesting Officer     Commissioner of Patents and Trademarks